United States Patent
Schnaibel et al.

(10) Patent No.: US 6,324,834 B1
(45) Date of Patent: Dec. 4, 2001

(54) RUNNING OF AN INTERNAL COMBUSTION ENGINE IN CONJUNCTION WITH AN NOX-ACCUMULATOR CATALYTIC CONVERTER

(75) Inventors: Eberhard Schnaibel, Hemmingen; Andreas Blumenstock, Ludwigsburg; Klaus Winkler, Rutesheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,449
(22) PCT Filed: Dec. 15, 1998
(86) PCT No.: PCT/DE98/03677
 § 371 Date: Aug. 16, 1999
 § 102(e) Date: Aug. 16, 1999
(87) PCT Pub. No.: WO99/31367
 PCT Pub. Date: Jun. 24, 1999

(30) Foreign Application Priority Data

Dec. 15, 1997 (DE) .............................................. 197 55 600

(51) Int. Cl.⁷ ....................................................... F01N 3/00
(52) U.S. Cl. ................... 60/274; 60/286; 60/295; 60/285
(58) Field of Search ............................. 60/274, 286, 295, 60/285

(56) References Cited

U.S. PATENT DOCUMENTS

| | | | |
|---|---|---|---|
| 5,325,664 | * 7/1994 | Seki et al. | 60/285 |
| 5,713,199 | * 2/1998 | Takeshima et al. | 60/285 |
| 5,771,686 | * 6/1998 | Pischinger et al. | 60/286 |
| 5,778,663 | * 7/1998 | Kostka | 60/285 |
| 5,927,068 | * 7/1999 | Schenk | 60/274 |
| 6,026,640 | * 2/2000 | Kato et al. | 60/274 |

FOREIGN PATENT DOCUMENTS

| | | | |
|---|---|---|---|
| 0560991 | 9/1993 | (EP) . | |
| 0690213 | 1/1996 | (EP) . | |
| 0733787 | 9/1996 | (EP) | 60/286 |
| WO 98 55742 A | 12/1998 | (WO) . | |

* cited by examiner

Primary Examiner—Thomas Denion
Assistant Examiner—Thai-Ba Trieu
(74) Attorney, Agent, or Firm—Walter Ottesen

(57) ABSTRACT

A method is presented for controlling the supply of reducing agent to a NOx-storage catalytic converter of an internal combustion engine, which is operated at least at times with a lean air/fuel mixture, with an exhaust-gas sensor mounted in flow direction rearward of the NOx-storage catalytic converter; wherein the supply of the reducing agent takes place repeatedly in time intervals separate from each other; and wherein the reducing agent quantity, which is supplied in each time interval, is reduced compared to that quantity which is supplied in a previous supply phase in which a reaction of the exhaust-gas sensor occurred.

5 Claims, 3 Drawing Sheets

RUNNING OF AN INTERNAL COMBUSTION ENGINE IN CONJUNCTION WITH AN NOX-ACCUMULATOR CATALYTIC CONVERTER

FIELD OF THE INVENTION

The invention relates to the operation of an internal combustion engine in combination with an NOx-storage catalytic converter. In the area of the combustion with a lean air/fuel mixture (lambda greater than 1), the three-way catalytic converter no longer satisfies the requirements as to exhaust-gas quality. Here, NOx-storage catalytic converters are used which store emitted nitrogen oxide during lean engine operation. Stored nitrates are released and reduced to nitrogen because of the operation of the engine in the rich region (lambda less than 1). Ideally, the engine is operated lean in a first phase until the NOx-storage catalytic converter is full; that is, until the NOx-storage catalytic converter can no longer store nitrous oxides. A second phase with rich operation continues ideally from the latter for that time span which is necessary to regenerate the NOx-storage catalytic converter. The storage capability of the NOx-catalytic converter in the lean operating region is dependent upon charge and continuously reduces. If the first phase takes too long, then unwanted nitrogen oxide emissions occur. A second phase which continues too long has increased HC emissions and CO emissions as a consequence. For this reason, the problem is present to undertake the change between the two phases so that neither increased NOx emissions nor HC emissions occur.

BACKGROUND OF THE INVENTION

In this connection, it is known from U.S. Pat. No. 5973887 to estimate the NOx quantity, which is stored in a first phase, by a summed engine rpm and then to change into a second phase when the summed engine rpm exceeds a predetermined threshold value. The stored quantity is thereby modeled. The actual value of the stored quantity is not detected. The modeling can only incompletely simulate the actual stored quantity. For this reason, the first phase is either too long or too short with the above-mentioned disadvantageous consequences for the quality of the exhaust gas.

The U.S. Patent application Ser. No. 09/150,600 describes a possibility to fix the end of the second phase with rich engine operation, that is, oxygen deficiency in the exhaust gas. An oxygen-measuring probe in the exhaust gas rearward of the storage catalytic converter serves this purpose. As soon as the probe detects a crossover from a lean mixture to a rich mixture, this means that the storage catalytic converter no longer outputs sufficient oxygen for the oxidation of the hydrocarbons and the carbon monoxide and is empty of NOx containing oxygen (oxygen store and NOx store emptied). Thereupon, the second phase can be ended with oxygen deficiency and a reversal to the first phase with a lean mixture (oxygen excess) can be made. Thereby a breakthrough of CO and HC to end the regeneration phase is deliberately accepted after each storage interval. With each phase change, unwanted CO and HC emissions occur which can present problems for the maintenance of the toxic substance limit values in the sum over many phase changes. In addition, for each phase change, the oxygen store of the system is emptied and therefore fuel consumption is unnecessarily increased.

SUMMARY OF THE INVENTION

With this background, it is the object of the invention to provide a control of the regeneration of a storage catalytic converter which comes closer to the ideal of an optimal usage of the NOx storage capability by respective complete fillings and discharges of the storage catalytic converter while simultaneously reducing the unwanted HC emissions and CO emissions.

A further object is to control the regeneration of the storage catalytic converter via a control of the mixture composition of the engine in such a manner that, overall, an exhaust gas improvement results compared to known methods.

In detail, in one embodiment of the invention, a control of the air/fuel ratio during operation of the internal combustion engine having a catalytic converter and an exhaust-gas sensor mounted rearward of the catalytic converter in flow direction takes place so that, alternately, a lean operation of the engine and a rich operation of the engine is controlled with the degree of enrichment and/or the duration of the rich phases being changed in dependence upon the course of the signal of the above-mentioned exhaust-gas sensor in a previous rich phase.

Here, the engine is operated with a lean mixture in average over time.

According to the invention, the supply of reducing agent is not alone pregiven in a controlled manner with the aid of a model based on operating parameters of the engine but is adapted with the aid of an exhaust-gas probe mounted rearward of the catalytic converter.

If the above-mentioned exhaust-gas probe indicates an excess of a reducing agent in a rich phase, then the quantity of the reducing agent to be supplied for a next rich phase is reduced. This can, for example, take place via a shortening of the rich phase or via a reduction of the degree of enrichment.

For an adequate reduction, the above-mentioned exhaust-gas probe will no longer indicate too much of a reducing agent at the end of the next rich phase. Then, the quantity of the reducing agent, which is to be supplied in the next rich phases, is successively increased until a reaction of the exhaust-gas sensor, which is mounted rearward of the catalytic converter, occurs anew. The unwanted breakthrough of the reducing agent therefore takes place rarely in the method according to the invention. In this way, the quality of the exhaust gas is advantageously improved. The invention adapts the quantity of the reducing agent to be supplied in a closed working chain.

A conventional oxygen-sensitive lambda probe or, for example, an HC sensor can be used as the sensor mounted rearward of the catalytic converter.

The invention is not limited to a richness control of the engine for making HC and CO available in the exhaust gas as a reducing agent. The reducing agent can, for example, be metered in a controlled manner from other sources such as urea from a supply tank.

BRIEF DESCRIPTION OF THE DRAWINGS

In the following, an embodiment will be explained with reference to the drawings.

DESCRIPTION OF THE PREFERRED EMBODIMENTS OF THE INVENTION

Figure 1:
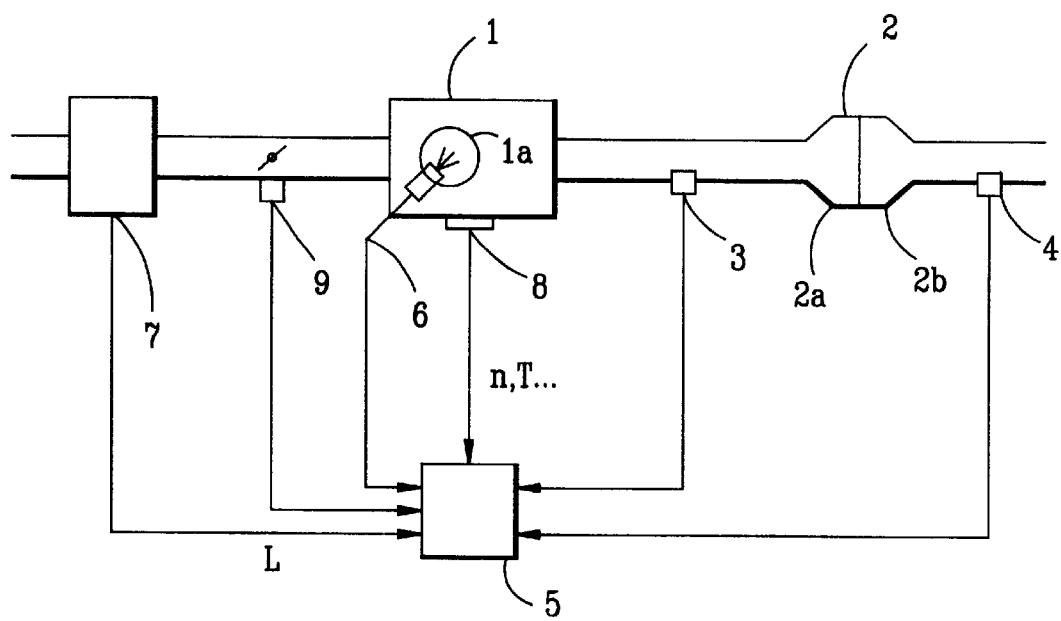
FIG. 1 shows the technical background in which the invention functions.

In detail, FIG. 1 shows an internal combustion engine 1 having a catalytic converter 2, exhaust-gas probes 3 and 4, a control apparatus 5, a fuel-metering means 6 as well as various sensors (7, 8, 9) for load L and engine rpm n as well as other operating parameters of the engine as maybe required such as temperatures, throttle flap position, et cetera. The catalytic converter includes a first part 2a and a second part 2b. Part 2a defines the NOx-storage catalytic converter. Part 2b represents an integrated or downstream oxygen store.

The control apparatus forms, inter alia, fuel-metering signals with which the fuel-metering means 6 is driven. These signals are formed from the above-mentioned input signals and, if needed, other input signals. The fuel-metering means 6 can be configured for a so-called intake manifold injection as well as for a direct gasoline injection into the combustion chambers of the individual cylinders. The variation of the mixture composition can take place via a change of the injection pulsewidths with which the fuel-metering means is driven. In this background, the essence of the method of the invention concerns primarily the control apparatus 5 and the exhaust-gas probe 4 mounted rearward of the catalytic converter.

The internal combustion engine is operated alternately in first phases with a more fuel deficient (lean) mixture compared to the stoichiometric mixture composition (lambda=1) and in second phases with a more fuel rich (rich) mixture. In the first phases, the NOx catalytic converter stores the NOx emissions of the engine. In the second phases, a defined enrichment regenerates the storage catalytic converter. The regeneration takes place via a reduction of the stored nitrates to nitrogen (N2). The store 2a must be almost completely emptied and therefore, adequate reducing agents must be supplied in order to achieve high storage and converting rates of the NOx-storage catalytic converter.

Figure 2A:
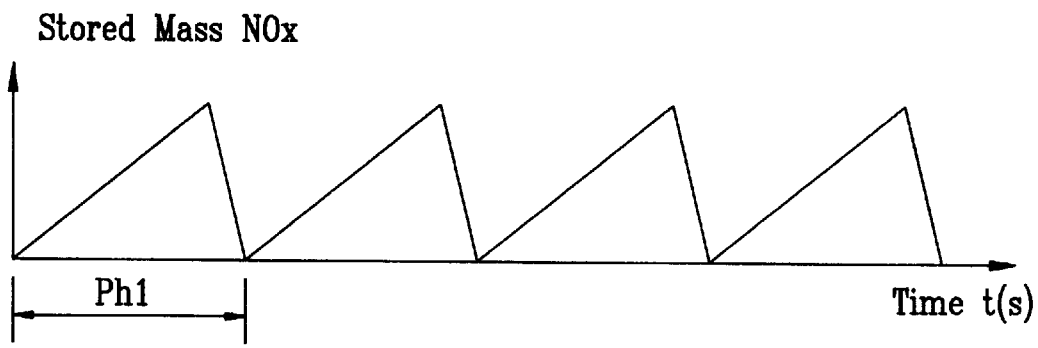
FIG. 2 shows an embodiment of the method of the invention.
Figure 2B:
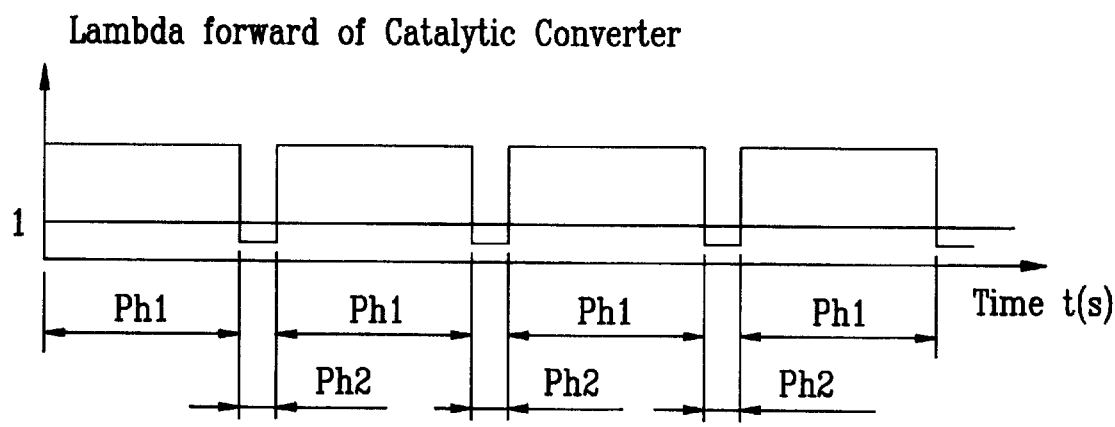
Figure 2C:
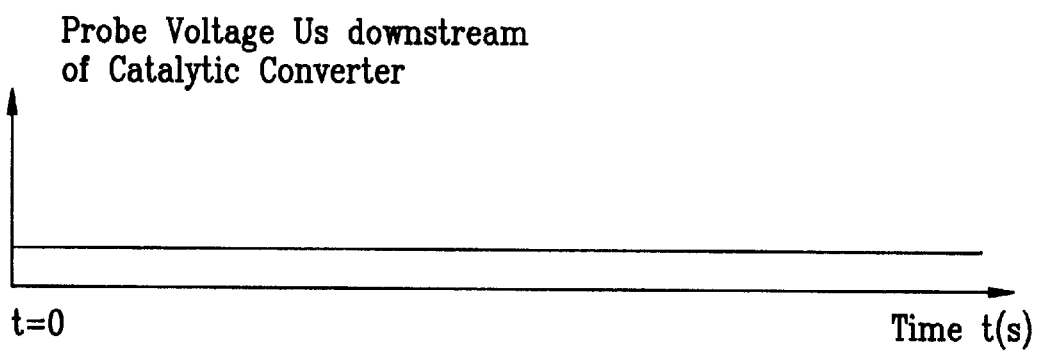

FIG. 2 shows the phase change in combination with the following: an illustration of the stored NOx quantity (FIG. 2a); the corresponding air/fuel ratio lambda as detected by the exhaust-gas probe 3 which is mounted forward of the catalytic converter (FIG. 2b); and, the signal performance of the exhaust-gas probe 4, which is mounted rearward of the catalytic converter (FIG. 2c) for the ideal case, which is to be strived for, of a complete filling and discharge, respectively, of the NOx-storage catalytic converter.

At time point t=0, the NOx-storage catalytic converter is empty. In the following first phase Ph1, the internal combustion engine is operated with a lean mixture ($\lambda$>1). The nitrogen oxides, which are emitted, are stored in the storage catalytic converter. The first phase (lean phase) is ideally ended when the storage catalytic converter 2a is full. A second phase Ph2 continues from the first phase and the storage catalytic converter is regenerated in this second phase Ph2. In this embodiment, the regeneration takes place with the aid of a rich engine operation in phase Ph2. Here, the engine, which operates with a fuel richer mixture, emits uncombusted HC and CO as a reducing agent. Under the action of the catalytic converter, the reducing agent reacts with the stored nitrogen oxides to form water, C02 and N2 which are transported further with the exhaust gas. The store is again made capable for receiving nitrogen oxides; that is, the store is regenerated. The control apparatus 5 reverses in continuous change between phases Ph1 and Ph2.

In the ideal case, the regeneration (phase 2) takes place until the storage catalytic converter 2a is completely emptied and ends before excessive reducing agent occurs rearward of the catalytic converter. The occurrence of excessive reducing agent is associated with oxygen deficiency and can therefore be detected with an oxygen-sensitive exhaust-gas sensor 4. As an alternative thereto, excessive hydrocarbons can, for example, also be detected directly with an HC sensor in lieu of or as a supplement to the oxygen-sensitive exhaust-gas sensor 4. According to FIG. 2a, the storage catalytic converter is completely empty at the end of a rich phase Ph2 and, according to FIG. 2c, the signal course of the exhaust-gas sensor 4, which is mounted rearward of the catalytic converter, does not change. The shown low level of the sensor signal represents an oxygen excess and therefore, averaged over time, the lean operation of the engine mostly optimized for consumption.

Since a precise computation of the necessary quantity of reducing agent in the engine operation is not possible, the catalytic converter 2 advantageously has an integrated or downstream oxygen store 2b which acts as a buffer. An impermissibly high supply of reducing agent CO and HC will react with the oxygen stored in the oxygen store 2b. The downstream oxygen store is emptied ideally to the extent of only one half via the excess reducing agent. The downstream oxygen store permits a certain excessive metering of reducing agent which is advantageous for ensuring the complete emptying of the storage catalytic converter 2a. The strived for emptying of the oxygen store up to one half makes possible a compensation of metering inaccuracies which are unavoidable in the actual operation.

Figure 3A:
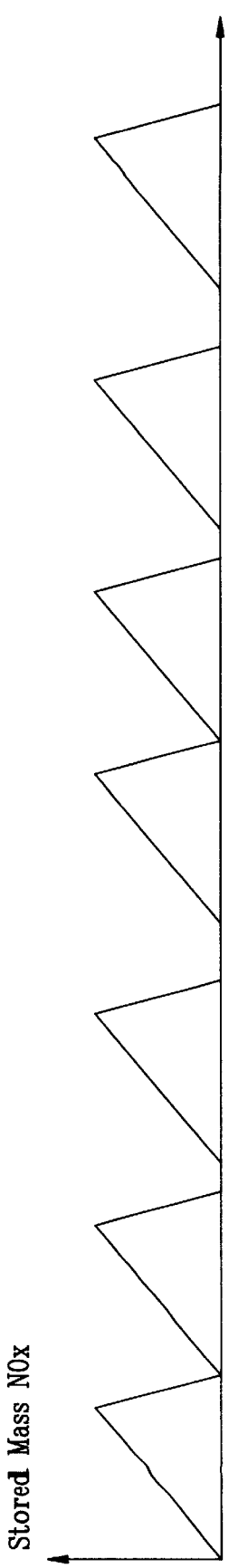
FIG. 3 illustrates the invention with a graphic representation of the fill level of the NOx-storage catalytic converter when carrying out the method of the invention.

FIG. 3 shows the invention similar to the illustration of FIG. 2.

Figure 3B:
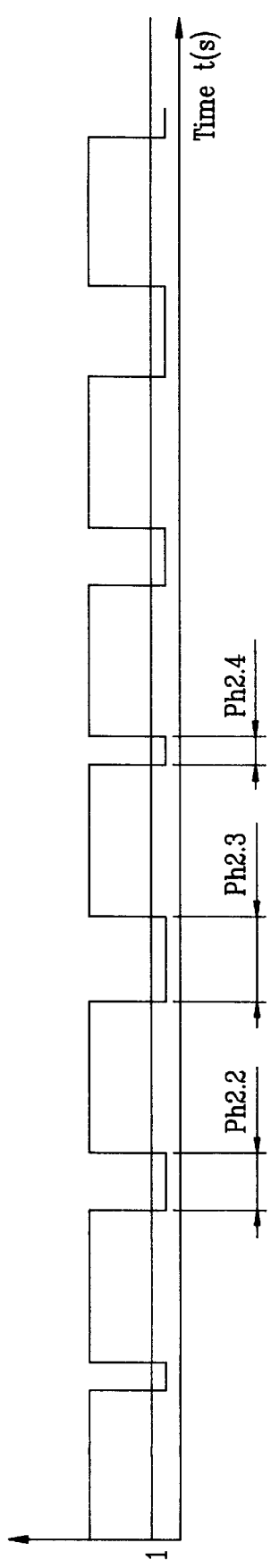

As shown in FIG. 3b, the control of the engine first takes place such that the sensor 4, which is mounted rearward of the catalytic converter, does not change its signal course and remains at a level characteristic for a lean mixture. This can mean that the length of the rich phases is already optimal. That is, the length corresponds to the requirement except for metering fuzziness, which is buffered by oxygen storage catalytic converter 2b, so that the storage catalytic converter 2a is completely regenerated. However, it can also be that the length of the rich phases is not adequate for a complete regeneration of the storage catalytic converter. For this reason, the length of the rich phases is successively increased in the manner of testing. At the end of the third rich phase Ph2.3, the reducing agent input into the catalytic converter system 2 exceeds the amount, which is pregiven by the regeneration requirement 2a plus buffer quantity 2b, so that, behind the catalytic converter, an oxygen deficiency occurs in combination with an excess of reducing agent such as CO and HC.

Figure 3C:
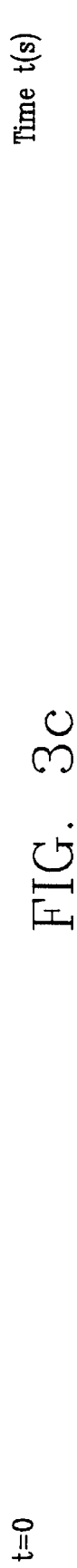

FIG. 3c shows the resulting change of the signal course of the exhaust-gas sensor 4 which, for example, can be detected by a threshold value comparison.

The rich phase Ph2.3, which corresponds to the triggering of the signal change, is therefore just too long in order to be buffered by the catalytic converter system 2, whereas, the previous rich phase Ph2.2 was not long yet enough in order to trigger a reaction. The actual reducing agent requirement can therefore be determined to a degree of accuracy which is determined by the changing width of the successive lengthenings.

The following rich phases Ph2.4, et cetera are shortened. The extent of the shortening is so dimensioned that the storage catalytic converter 2a is always still completely regenerated but the oxygen storage catalytic converter 2b is emptied only up to approximately one half. Thereafter, the method is repeated and the rich phases are therefore again successively lengthened. The lengthening must, however, not per force be started immediately. It is also conceivable to store the value for the actual operating point which is determined as optimal and to start a new adaptation passthrough only after the occurrence of predetermined conditions, for example, after a certain time has elapsed.

Alternatively to the successive lengthening of the rich phases, a successive increase of the degree of enrichment can be also carried out. Both alternatives can also be combined.

What is claimed is:

1. A method for supplying a reducing agent to a NOx-storage catalytic converter of an internal combustion engine, which is operated at least at times with a lean air/fuel mixture, the method comprising the steps of:

mounting an exhaust-gas sensor in flow direction rearward of the NOx-storage catalytic converter;

supplying the reducing agent repeatedly in time intervals separate from each other;

reducing the reducing agent quantity, which is supplied in each time interval, compared to that quantity which is supplied in a previous supply phase in which a reaction of the exhaust-gas sensor has occurred; and, wherein the supply of said reducing agent to said NOx-storage catalytic converter during operation of said engine takes place with a fuel rich mixture and the control of the air/fuel ratio during operation of said engine takes place pursuant to the further method steps of:

operating the internal combustion engine alternately in first phases with a mixture, which has less fuel compared to the stoichiometric mixture composition, and, in second phases (supply phases), with a fuel richer mixture;

varying the quantity of said reducing agent in each second phase (time interval) by the degree of enrichment with fuel and/or the length of the following second phases; and, wherein the internal combustion engine is operated in average with a fuel deficient mixture with the average being formed over several of said first and second phases.

2. The method of claim 1, wherein the degree of enrichment with fuel is reduced.

3. A method for supplying a reducing agent to a NOx-storage catalytic converter of an internal combustion engine, which is operated at least at times with a lean air/fuel mixture, the method comprising the steps of:

mounting an exhaust-gas sensor in flow direction rearward of the NOx-storage catalytic converter;

supplying the reducing agent repeatedly in time intervals separate from each other;

reducing the reducing agent quantity, which is supplied in each time interval, compared to that quantity which is supplied in a previous supply phase in which a reaction of the exhaust-gas sensor has occurred; and, wherein the supply of said reducing agent to said NOx-storage catalytic converter during operation of said engine takes place with a fuel rich mixture and the control of the air/fuel ratio during operation of said engine takes place pursuant to the further method steps of:

operating the internal combustion engine alternately in first phases with a mixture, which has less fuel compared to the stoichiometric mixture composition, and, in second phases (supply phases), with a fuel richer mixture;

varying the quantity of said reducing agent in each second phase (time interval) by the degree of enrichment with fuel and/or the length of the following second phases; and, wherein the length of following second phases is shortened.

4. A method for supplying a reducing agent to a NOx-storage catalytic converter of an internal combustion engine, which is operated at least at times with a lean air/fuel mixture, the method comprising the steps of:

mounting an exhaust-gas sensor in flow direction rearward of the NOx-storage catalytic converter;

supplying the reducing agent repeatedly in time intervals separate from each other;

reducing the reducing agent quantity, which is supplied in each time interval, compared to that quantity which is supplied in a previous supply phase in which a reaction of the exhaust-gas sensor has occurred; and, wherein the supply of said reducing agent to said NOx-storage catalytic converter during operation of said engine takes place with a fuel rich mixture and the control of the air/fuel ratio during operation of said engine takes place pursuant to the further method steps of:

operating the internal combustion engine alternately in first phases with a mixture, which has less fuel compared to the stoichiometric mixture composition, and, in second phases (supply phases), with a fuel richer mixture;

varying the quantity of said reducing agent in each second phase (time interval) by the degree of enrichment with fuel and/or the length of the following second phases; and, wherein a first following second phase is shortened and additional following second phases are successively lengthened.

5. The method of claim 4, wherein the following second phases are successively lengthened until a reaction of the above-mentioned exhaust-gas probe signalizes at least one of: an oxygen deficiency and the appearance of hydrocarbons.

* * * * *